June 23, 1931.  F. O. FERNSTRUM  1,810,953
MOTOR BOAT LAYOUT
Filed May 31, 1930   2 Sheets-Sheet 1

INVENTOR
Frank O. Fernstrum,
BY
ATTORNEYS

June 23, 1931.   F. O. FERNSTRUM   1,810,953
MOTOR BOAT LAYOUT
Filed May 31, 1930   2 Sheets-Sheet 2
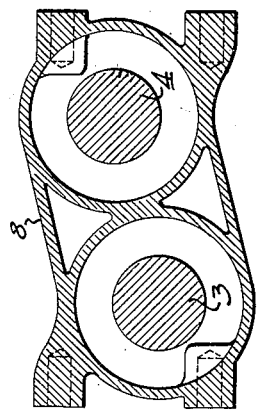
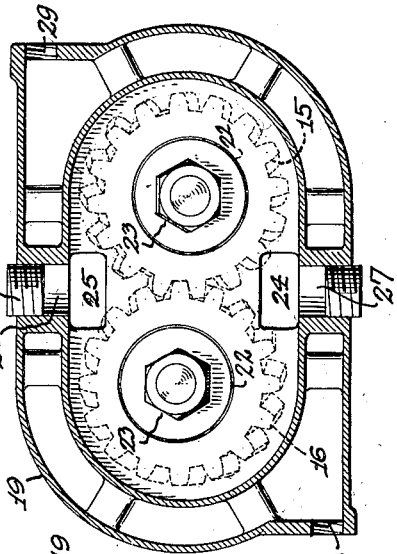
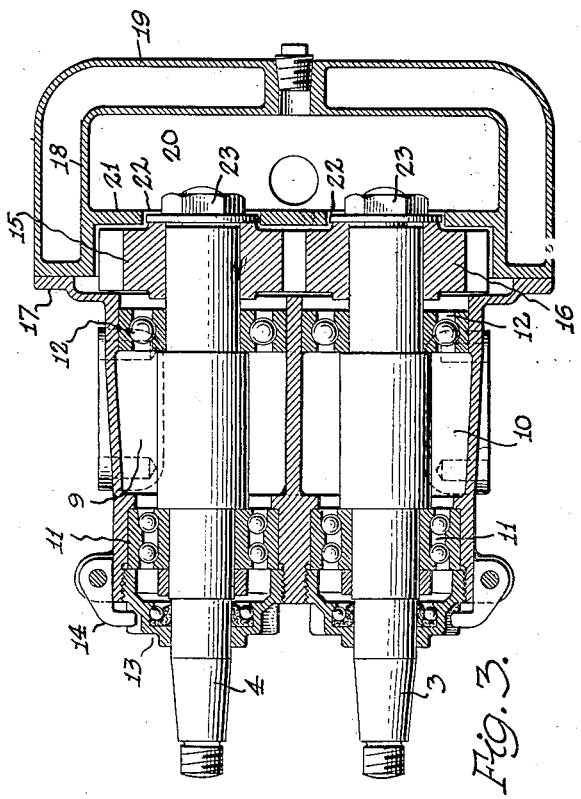
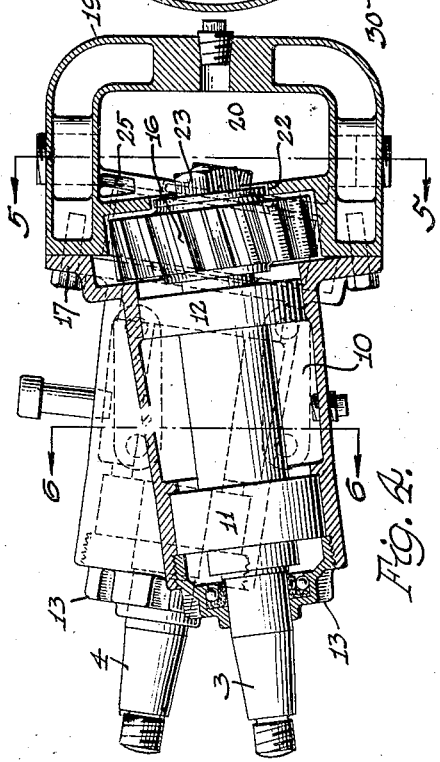
INVENTOR
Frank O. Fernstrum,
BY
ATTORNEYS Patented June 23, 1931

1,810,953

UNITED STATES PATENT OFFICE

FRANK O. FERNSTRUM, OF DETROIT, MICHIGAN, ASSIGNOR TO GRAY MARINE MOTOR CO., OF DETROIT, MICHIGAN, A CORPORATION OF MICHIGAN

MOTOR BOAT LAYOUT

Application filed May 31, 1930. Serial No. 458,350.

The present invention pertains to a novel motor boat layout, and the objects are to provide a more convenient and efficient disposition of the motor, as well as a safer disposition of the motor with respect to fire hazard.

In motor boats of the runabout and cruiser types, it is customary to install the motor approximately amidships, and to provide seating compartments forward and aft of the motor. This arrangement is inconvenient in that the passengers are divided into two separated groups, whereas it would be more agreeable if they could be accommodated in a single seating compartment. Moreover, the passengers in the compartment aft of the motor are subject to the hazards of fire and explosion at the motor, since these passengers are normally traveling in the direction towards the motor.

The present invention overcomes these difficulties by a characteristic disposition of the motor in the stern of the vessel, so that the seating space may be built in a single, uninterrupted compartment forward of the engine. Furthermore, the passengers in such a vessel are normally travelling away from the motor rather than towards it, so that they are not exposed to the above mentioned hazards. This arrangement of the motor also enables a more efficient distribution of load as will be more fully described hereinafter.

A further object of the invention is to balance the starting torque reaction of the propeller, and this is accomplished by offsetting the motor laterally from the longitudinal center plane of the hull, the propeller shaft being disposed in the center plane.

The invention is fully disclosed by way of example in the following description and in the accompanying drawings, in which—

Fig. 3 is a plan view of the transmission or the gearing between the motor shaft and propeller shaft;

Fig. 4 is a longitudinal section in a plane at right angles to that shown in Figure 3; and Figs. 5 and 6 are sections on the lines 5—5 and 6—6 respectively of Figure 4.

Reference to these views will now be made by use of like characters which are employed to designate corresponding parts throughout.

Figure 1:
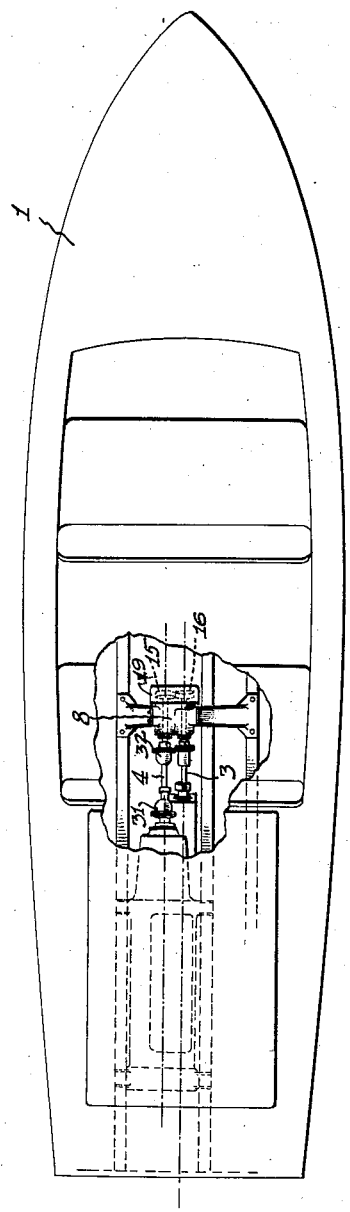
Figure 1 is a plan view of a runabout type of boat equipped according to the invention.
Figure 2:
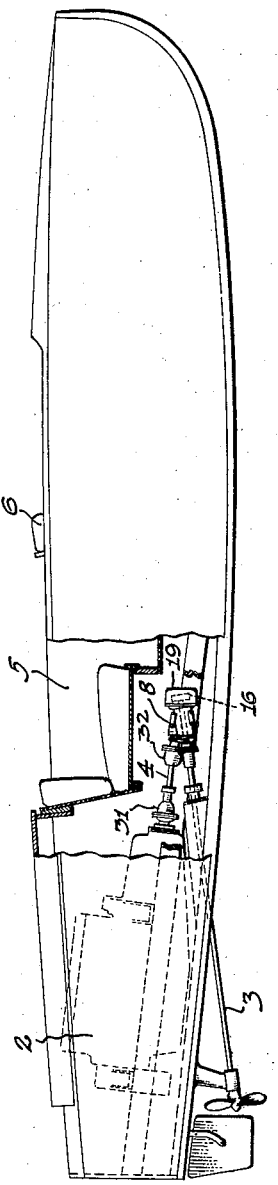
Fig. 2 is a side elevation thereof, partly in section.

In Figure 1 is illustrated the hull 1 having the general outline of a runabout type of vessel, except for the location of the engine compartment and seating compartment as will presently appear.

The motor 2 is installed in the stern of the vessel and has a forward decline following that of the keel in this area. A propeller shaft 3 is suitably journalled in the hull at the proper angle and obviously in the center-line of the hull. Inasmuch as it is desirable, for economical and practical reasons, to employ a transmission wherein the driving and driven gears are disposed laterally of each other, rather than one above the other, it follows that the drive or motor shaft 4 and the center line of the motor 2 must be offset laterally from the axis of the hull. It is well known, however, that the center of gravity line of an engine does not always coincide with the center line, and the engine may therefore be offset from the axial line of the hull at one side or the other, as determined by the direction of torque reaction, with a view to balancing the starting torque reaction of the propeller. If the propeller turns clockwise in going forward, the motor is obviously placed on the port side of the longitudinal center plane of the hull. If any inequality in the balancing still remains, it can be overcome by proper placement of other equipment and seating of passengers.

Immediately forward of the motor 2 is built a seating compartment 5 which constitutes the entire seating capacity of the boat and contains a suitable number of transverse sheets 6.

The transmission mechanism includes a casing 8 divided into two bearing cylinders 9 and 10 for the engine shaft 4 and propeller shaft 3 respectively. These cylinders are disposed one beside the other to enable the use of similarly arranged connecting gears, for it has been found that a noiseless and efficient mechanism of this type may be built at a practical cost. The axes of the cylinders are arranged at an angle to each other, conforming to the angle between the motor and propeller shafts. The housing 8 is positioned approximately amidships, preferably beneath one of the seats 6. This does away with the extended shafts which are ordinarily geared together in the bow of the boat; and in the present instance the two shafts may intersect amidships, while maintaining the proper angle of the propeller shaft 3, because of the forward decline of the motor 2.

The cylinders 9 and 10 contain two pairs of suitable roller bearings 11 and 12 for accommodating each of the shafts at two points. The rearward end of each cylinder is closed by a suitable packing member 13 screwed into the end and held by a finger 14 against turning. The forward ends of the shafts carry skew gears 15 and 16 meshing with each other and having straight-sided teeth, although at an angle to the axes of the gears. This type of gear has been selected for reasons of economy.

The forward end of the housing 8 is formed with an outward flange 17 partly enclosing the gears 15 and 16. To this flange is secured a head having a double wall 18, 19 and confining the gears in a grease chamber 20 within the inner wall. The chamber has a partition 21 at the forward faces of the gears, suitably apertured at 22 to accommodate the hubs and lock nuts 23 of the gears. The partition has a lower aperture 24 and an upper aperture 25 serving respectively as inlet and outlet between the chamber 20 and the other side of the partition 21, so that the gears while running function as a pump which induces circulation of lubricant. Ports 26 and 27 are formed through the double wall in communication with the chamber 20 for charging and draining the chamber, and are normally closed by plugs 28. The space between the walls 18 and 19 is used as a water jacket and communicates with ports 29 and 30 for connection into a water circulating system.

The above mentioned advantages as to seating capacity and fire hazard will now be obvious. It will also be evident that the motor located in the stern of the boat has more water support than if located approximately amidships in the customary manner, in which case it would be entirely out of the water at high speed and would exert a great pressure on the immersed part of the hull in cantilever fashion. The location of the motor in the stern of the boat therefore avoids this pressure and results in greater efficiency of the engine as well as greater speed of the vessel, while even at lower speeds the peculiar location of the engine produces the tilt which is considered to be the more efficient position of the hull with respect to the surface of the water.

The motor shaft 4 is preferably provided with two universal joints 31 and 32 for proper meshing of the gears 15 and 16 in keeping with the predetermined angle of the shaft 3 and gear 16 and to allow compensation for variations in the slope of the keel at the stern.

Although a specific embodiment of the invention has been illustrated and described, it will be understood that various alterations and modifications in the details of construction may be made without departing from the scope of the invention as indicated by the appended claims.

What I claim is:—

1. In a boat hull, a single motor mounted therein, a seating compartment entirely forward of said motor, a propeller shaft journalled in the center plane of said hull, a propeller on said shaft, said motor being geared to said propeller shaft and offset laterally from said plane in a position to balance the starting torque reaction of said propeller.

2. In a boat hull, a single motor mounted in the stern thereof, a seating compartment entirely forward of said motor, a propeller shaft journalled in the center plane of said hull, a propeller on said shaft, said motor being offset laterally from said plane in a position to balance the starting torque reaction of said propeller and geared to said propeller at a point forward of said motor.

In testimony whereof I affix my signature.

FRANK O. FERNSTRUM.